United States Patent
Lassalle et al.

(10) Patent No.: US 11,535,363 B2
(45) Date of Patent: Dec. 27, 2022

(54) HYDRAULIC ACTUATION SYSTEM

(71) Applicant: Ratier-Figeac SAS, Figeac (FR)

(72) Inventors: Julien Lassalle, Saint Jean Lagineste (FR); Thibaut Marger, Beduer (FR)

(73) Assignee: RATIER-FIGEAC SAS, Figeac (FR)

( * ) Notice: Subject to any disclaimer, the term of this patent is extended or adjusted under 35 U.S.C. 154(b) by 94 days.

(21) Appl. No.: 16/721,145

(22) Filed: Dec. 19, 2019

(65) Prior Publication Data

US 2021/0009253 A1  Jan. 14, 2021

(30) Foreign Application Priority Data

Jul. 12, 2019  (EP) ..................................... 19290055

(51) Int. Cl.
*B64C 11/38*  (2006.01)

(52) U.S. Cl.
CPC ................... *B64C 11/38* (2013.01)

(58) Field of Classification Search
CPC ...... B64C 11/38; F15B 20/004; F15B 20/008; F15B 19/005; F15B 2211/8633; F15B 2211/8636; F15B 2211/87
See application file for complete search history.

(56) References Cited

U.S. PATENT DOCUMENTS

| | | | |
|---|---|---|---|
| 5,174,718 A * | 12/1992 | Lampeter | B64C 11/38 416/157 R |
| 6,059,528 A | 5/2000 | Danielson et al. | |
| 7,172,391 B2 | 2/2007 | Carvalho | |
| 8,573,927 B2 | 11/2013 | Swift et al. | |
| 8,651,812 B2 | 2/2014 | Wilson et al. | |
| 9,239,064 B2 * | 1/2016 | Helbig | F15B 1/022 |
| 9,624,946 B2 | 4/2017 | Bihel et al. | |
| 10,577,080 B2 * | 3/2020 | Maver | B64C 11/385 |
| 10,745,111 B2 * | 8/2020 | Lassalle | F01D 7/00 |
| 2015/0354604 A1 * | 12/2015 | Froehlich | F15B 20/002 60/560 |
| 2017/0313406 A1 | 11/2017 | Lassalle | |
| 2018/0327082 A1 * | 11/2018 | Lassalle | F15B 13/0438 |
| 2019/0016442 A1 * | 1/2019 | Marger | B64C 11/385 |
| 2019/0061916 A1 | 2/2019 | Maver | |

FOREIGN PATENT DOCUMENTS

| | | | | |
|---|---|---|---|---|
| EP | 2378081 B1 | 4/2015 | | |
| EP | 2351925 A3 | 7/2015 | | |
| WO | WO-2014172704 A1 * | 10/2014 | ............ | F15B 11/003 |

OTHER PUBLICATIONS

European Search Report for Application No. 19290055.3, dated Jan. 20, 2020, 8 pages.

* cited by examiner

*Primary Examiner* — Kenneth Bomberg
*Assistant Examiner* — Ryan C Clark
(74) *Attorney, Agent, or Firm* — Cantor Colburn LLP

(57) ABSTRACT

There is provided an hydraulic actuation system for an aircraft, the hydraulic actuation system includes an actuator (A), a primary actuation arrangement to provide hydraulic fluid to control the actuator (A), wherein the hydraulic actuation system is configured to detect a fault in the actuator (A). The hydraulic actuation system also includes a secondary actuation arrangement to provide hydraulic fluid to control the actuator (A) in response to a detection of a fault in the actuator (A).

13 Claims, 2 Drawing Sheets

HYDRAULIC ACTUATION SYSTEM

FOREIGN PRIORITY

This application claims priority to European Patent Application No. 19290055.3 filed Jul. 12, 2019, the entire contents of which is incorporated herein by reference.

TECHNICAL FIELD

This disclosure relates to hydraulic actuation systems. In particular, this disclosure relates to hydraulic systems for propellers, such as pitch change actuators.

BACKGROUND

Hydraulic actuation systems that use hydraulic power to facilitate mechanical motion (e.g. linear, rotary or oscillatory motion) have many uses across a range of technologies. An hydraulic actuation system typically includes an hydraulic power supply, a metering valve (for example, an electro-hydraulic servovalve) controlled by a controller, and an actuator driven by the hydraulic flow from the metering valve. For example, a typical linear hydraulic actuator includes a piston that can slide within a tube and can be single-acting or double-acting. In a double-acting actuator, hydraulic fluid pressure is applied from a chamber on each side of the piston and the pressure differential between the two chambers moves the piston one way or another.

Propeller pitch control systems commonly use hydraulic actuation systems to control the pitch of the propeller blades, known as pitch change actuators. Variable pitch propellers are employed on many different types of vehicles, such as aircraft. Typically, propeller blades are mounted to a rotary hub for pivotable movement about their longitudinal axis to permit pitch adjustment. The pitch adjustment is controlled by an hydraulic pitch change actuator.

In existing pitch change actuation systems, the servo controller, hydraulic power supply and metering valve (e.g. electro-hydraulic servovalve) are located in the static part of the nacelle, e.g. the static part of the engine driving the propeller. In existing systems, when there is a fault (e.g. loss in pressure) in the pitch change actuation systems, one of two methods is used to avoid catastrophic consequences of loss of control of the pitch of the propeller blades. One method and system is to provide pitch lock on the propeller blades to ensure that the blade pitch is locked at a setting slightly less than the pitch of the propeller at the time the oil pressure was lost. Another example of a system and method used when there is a fault is counterweights. Counterweights counteract the aerodynamic force that tries to move the blades toward a low-pitch angle. Both of these examples require cumbersome and heavy materials on the rotating part of the nacelle.

SUMMARY OF THE INVENTION

There is provided an hydraulic actuation system for an aircraft, the hydraulic actuation system includes an actuator, a primary actuation arrangement to provide hydraulic fluid to control the actuator, wherein the hydraulic actuation system is configured to detect a fault in the actuator. The hydraulic actuation system also includes a secondary actuation arrangement to provide hydraulic fluid to control the actuator in response to a detection of a fault in the actuator.

The actuator may also further include a first chamber and a second chamber. The primary actuation arrangement may control the hydraulic fluid in the first chamber and the second chamber. The actuator may also further include a third chamber. The secondary actuation arrangement may control the hydraulic fluid provided in the third chamber.

The first chamber may be configured to decrease pitch of a propeller blade of the aircraft. The second chamber may be configured to increase pitch of the propeller blade of the aircraft. The third chamber may be configured to increase pitch of the propeller blade of the aircraft.

The primary actuation arrangement may include at least one pressure sensor to detect a fault in the actuator. The primary actuation arrangement may also include an electric pump, a main pump, a by-pass valve and a primary electro-hydraulic servovalve to control the actuator.

The secondary actuation arrangement may include a signal module to provide a signal to a secondary electro-hydraulic servovalve to control the actuator.

The actuator may further include at least one seal.

The primary actuation arrangement may be provided on a static part of a nacelle and the secondary actuation arrangement may be provided on a rotating part of a nacelle.

There is also provided a method comprising providing an actuator, providing hydraulic fluid to control the actuator with a primary actuation arrangement, detecting a fault in the actuator by an hydraulic actuation system and providing hydraulic fluid to the actuator with a secondary actuation arrangement in response to the detected fault in the actuator.

There is also provided a nacelle for an aircraft, including a rotating part, a static part and the hydraulic actuation system as described above. The primary actuation arrangement is provided in or on the static part and the secondary actuation arrangement is provided in or on the rotating part.

DETAILED DESCRIPTION

Figure 1:
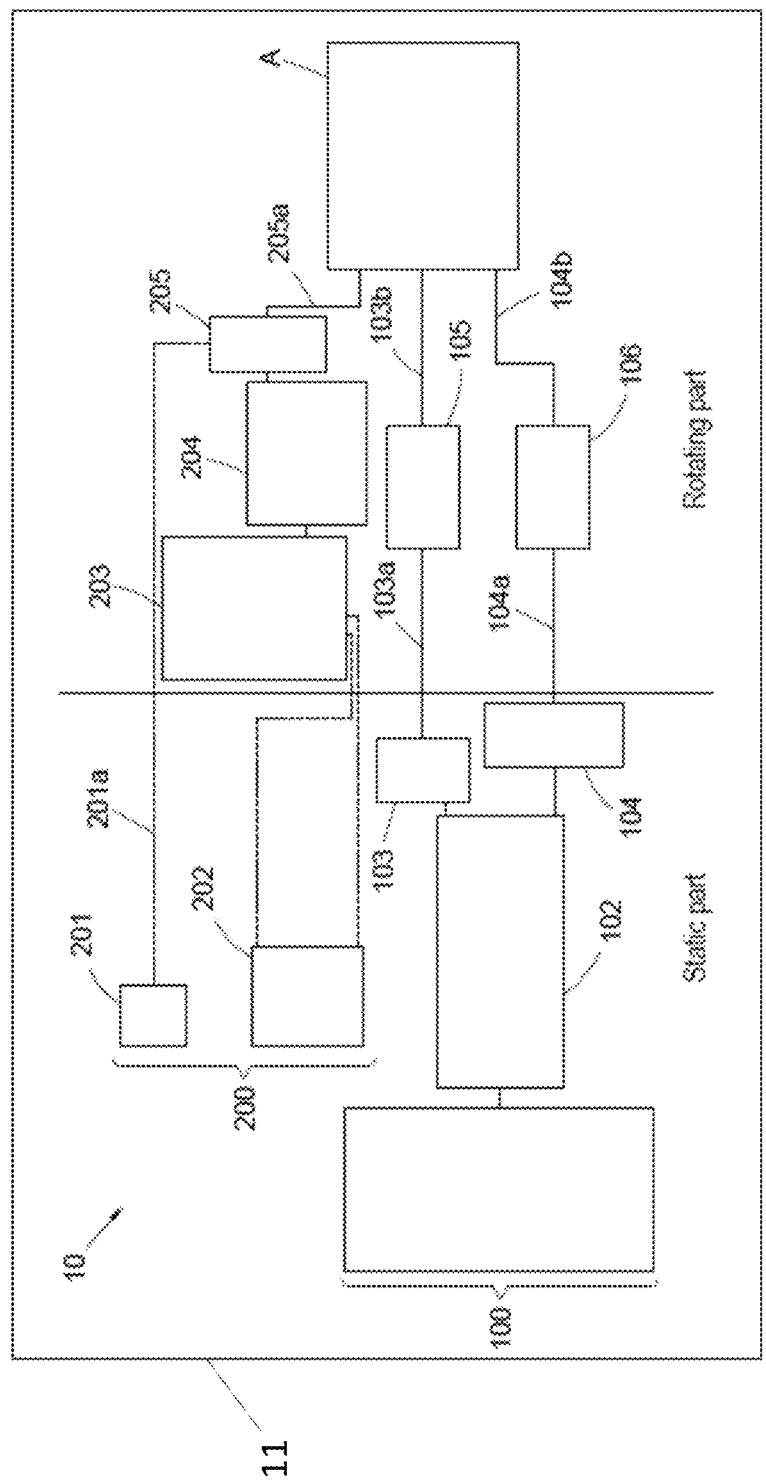
FIG. 1 shows an hydraulic actuation system.

FIG. 1 shows an hydraulic actuation system 10 for use, for example, with a pitch change actuator A. Of course, the hydraulic actuation system 10 described herein could be used with other types of actuators and is not limited for use with pitch change actuators.

The hydraulic actuation system 10 of FIG. 1 may include a primary hydraulic actuation arrangement 100 (i.e., a primary hydraulic actuation system). The primary actuation arrangement 100 may include a maintenance pump 101 (e.g. an electrical pump), a main pump 102 (e.g. a mechanical pump), a by-pass valve 103 and an electro-hydraulic servovalve 104. The maintenance pump 101, main pump 102, by-pass valve 103 and a primary electro-hydraulic servovalve 104 of the primary actuation arrangement 100 may be provided on a static part (referred to in FIG. 1 as 'static part') of the nacelle 11 (not shown) to control the actuator A that is provided on the rotating part (referred to as 'rotating part' in FIG. 1). The primary actuation arrangement 100 may also include pressure sensors 105 and 106 in the rotating part of the nacelle. The by-pass valve 103 may be connected by a transfer bearing 103a to the pressure sensor 105. The pressure sensor 105 may be connected to the actuator A by hydraulic line 103b. The primary electro-hydraulic servovalve 104 may be connected by a hydraulic line 104a to the pressure sensor 106. The pressure sensor 106 may be connected to the actuator A by hydraulic line 104b.

The primary actuation arrangement 100 works to provide normal operation to the actuator A to provide, for example, pitch change to propellers. That is, the differential pressure provided by the by-pass valve 103 and the primary electro-hydraulic servovalve 104 act together to respond to pilot commands, or a controller of the aircraft, to alter the pitch of the propeller blades. The pressure sensors 105 and 106 monitor the pressure provided in the actuator A and provide input as to which hydraulic line needs to be altered to maintain or change the pitch of the propeller blades. The pressure sensors 105 and 106 can provide data to the pilot or a controller on the aircraft. The pressure sensors 105 and 106 are capable of detecting defaults on the hydraulic system by the controller or the pilot.

FIG. 1 further shows a secondary actuation arrangement 200 (i.e., a secondary hydraulic actuation system). The secondary actuation arrangement 200 may include a signal module 201 that provides a signal 201a to a secondary electro-hydraulic servovalve 205. The secondary actuation arrangement 200 may also include a power module 202 to provide power to an electrically powered motor 203, which in turn may be connected to an hydraulic pump 204 that provides hydraulic fluid to the secondary electro-hydraulic servovalve 205. The secondary electro-hydraulic servovalve 205 may be connected by a hydraulic line 205a to actuator A. In the example shown in FIG. 1, the electrically powered motor 203, the hydraulic pump 204 and the secondary electro-hydraulic servovalve 205 may be located in the rotating part of the nacelle.

The primary actuation arrangement 100 provides normal operation to the actuator A. However, when a leak occurs in the actuator A, or there is a loss of pressure in the actuator A, the pressure sensors 105 and 106 detect a fault in the primary actuation arrangement 100. When a fault (e.g. loss of pressure) is detected in the primary actuation arrangement 100, the hydraulic actuation system 1 switches operation to the secondary actuator arrangement 200 that may be located on the rotating part of the nacelle. Therefore, the secondary actuator arrangement 200 acts as a back-up system on the nacelle to provide hydraulic function to the actuator A to resume manual or controller operations of the change in pitch of the propeller blades.

Figure 2:
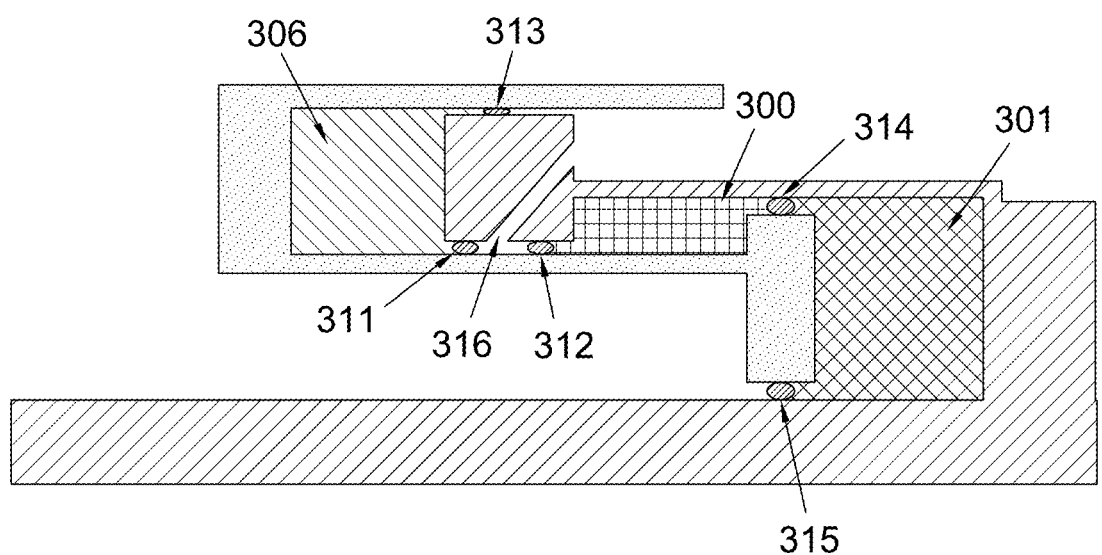
FIG. 2 shows an actuator of the hydraulic actuation system of FIG. 1.

FIG. 2 shows the actuator A of FIG. 1. The actuator A may include a first chamber 300 (also known as a fine chamber) and a second chamber 301 (also known as a coarse chamber). The first chamber 300 and the second chamber 301 together act on the actuator A to provide, for example, pitch change in propeller blades. The pressure difference between the first chamber 300 and second chamber 301 allows for the pitch angle of the propeller blades to be altered by a pilot or a controller of an aircraft. The first chamber 300, or fine chamber, may be set at a predetermined threshold value of pressure—for example a predetermined supply pressure ("$P_{supply}$"). The second chamber 301, or coarse chamber, may be altered from a pressure of between 0 and $P_{supply}$. This allows for the pitch of the propeller blades to be altered through the differential pressures provided by the first and second chambers 300 and 301. For example, the first chamber 300 may act to decrease the pitch of the propeller blade, and the second chamber 301 may act to increase the pitch of the propeller blade.

In relation to FIG. 1, the first chamber 300 may be connected to the by-pass valve 103 via transfer bearing 103a and hydraulic line 103b. The second chamber 301 may be connected to the primary electro-hydraulic servovalve 104.

The pressure sensors 105 and 106 of FIG. 1 detect when there is a fault (e.g. loss of pressure) in the first chamber 300 and/or the second chamber 301. Upon detection of a fault, e.g. by an aircraft controller, the hydraulic actuation system 10 of FIG. 1 switches from the primary actuation arrangement 100 to the secondary actuation arrangement 200 to resume operations of the actuator A to allow for the pitch in propeller blades to be maintained at a safe level. When the primary actuation arrangement 100 fails, it may be the case that the external loads on the propeller blades are acting to decrease the pitch due to the centre of gravity and aerodynamic effects of the propeller blades. In order to ensure safe operations, the secondary actuation arrangement 200 allows for a third chamber 306 to hydraulically control the actuator A and move the propeller blades to a high pitch to counteract the external load so that the blade pitch is always under control. The pressure provided by the third chamber 306 may be between 0 and $P_{supply}$. The third chamber 306 may be connected to the secondary electro-hydraulic servovalve 205 that is provided in the rotating part.

The actuator A may include at least one of a first, second, third, fourth and fifth dynamic seals 311, 312, 313, 314 and 315 to prevent leakage from the first chamber 300, second chamber 301 and third chamber 306. Although there are five seals shown in FIG. 2, it is envisaged that a greater number of seals may also be used to prevent leakage. There may also be provided a drain 316 between the first and second dynamic seals 311 and 312. In the example shown in FIG. 2, first seal 311 may prevent external leakage from the third chamber 306 to the drain 316. The second seal 312 prevents external leakage from the first chamber 300 to the drain 316. The third seal 313 prevents external leakage from the third chamber 306. The fourth seal 314 prevents leakage between the first chamber 300 and the second chamber 301. The fifth chamber 315 prevents external leakage from the second chamber 301. The drain 316 also acts to prevent leakages from the first chamber 300 and the third chamber 306. The drain 316 also prevents oils mixing within the actuator A.

Although this disclosure has been described in terms of preferred examples, it should be understood that these examples are illustrative only and that the claims are not limited to those examples. Those skilled in the art will be able to make modifications and alternatives in view of the disclosure which are contemplated as falling within the scope of the appended claims.

What is claimed is:

1. A hydraulic actuation system for an aircraft, the hydraulic actuation system comprising:
   an actuator (A);
   a primary actuation arrangement to provide hydraulic fluid to control the actuator (A), wherein the hydraulic actuation system is configured to detect a fault in the actuator (A); and
   a secondary actuation arrangement, wherein, in operation, the hydraulic actuation system is configured to switch operation from the primary actuation arrangement to the secondary actuation arrangement to provide hydraulic fluid to control the actuator (A) in response to a detection of a fault in the actuator (A);
   wherein the primary actuation arrangement is provided on a static part of a nacelle and the secondary actuation arrangement is provided on a rotating part of a nacelle.

2. The hydraulic actuation system of any claim 1, wherein the actuator (A) further comprises:
   a first chamber and a second chamber, and wherein the primary actuation arrangement controls the hydraulic fluid in the first chamber and the second chamber; and a third chamber, wherein the secondary actuation arrangement controls the hydraulic fluid provided in the third chamber.

3. The hydraulic system of claim 2, wherein the first chamber is configured to decrease pitch of a propeller blade of the aircraft;
wherein the second chamber is configured to increase pitch of the propeller blade of the aircraft; and
wherein the third chamber is configured to increase pitch of the propeller blade of the aircraft.

4. The hydraulic actuation system of claim 1, wherein the primary actuation arrangement includes at least one pressure sensor to detect a fault in the actuator (A).

5. The hydraulic actuation system of claim 1, wherein the primary actuation arrangement includes an electric pump, a main pump, a by-pass valve and a primary electro-hydraulic servovalve to control the actuator (A).

6. The hydraulic actuation system of claim 1, wherein the secondary actuation arrangement includes a signal module to provide a signal to a secondary electro-hydraulic servovalve to control the actuator (A).

7. The hydraulic actuation system of claim 1, wherein the actuator (A) further comprises at least one seal.

8. A nacelle for an aircraft, comprising:
a rotating part;
a static part; and
the hydraulic actuation system as claimed in claim 1;
wherein the primary actuation arrangement is provided in or on the static part and the secondary actuation arrangement is provided in or on the rotating part.

9. A method comprising:
providing an actuator (A);
providing hydraulic fluid to control the actuator (A) with a primary actuation arrangement;
detecting a fault in the actuator (A) by an hydraulic actuation system; and
switching operation from the primary actuation arrangement to a second actuation arrangement to provide hydraulic fluid to the actuator (A) with the secondary actuation arrangement in response to the detected fault in the actuator (A);
wherein the primary actuation arrangement is provided on a static part of a nacelle and the secondary actuation arrangement is provided on a rotating part of a nacelle.

10. The method of claim 9, wherein the actuator (A) comprises:
a first chamber and a second chamber, wherein the primary actuation arrangement controls the hydraulic fluid in the first chamber and the second chamber; and
a third chamber, wherein the secondary actuation arrangement controls the hydraulic fluid provided in the third chamber.

11. The method claim 9, wherein the primary actuation arrangement includes an electric pump, a main pump, a by-pass valve and a primary electro-hydraulic servovalve to control the actuator (A).

12. The method of claim 11, wherein the secondary actuation arrangement includes a signal module to provide a signal to a secondary electro-hydraulic servovalve to control the actuator (A).

13. The method of claim 11, wherein the actuator (A) further comprises at least one seal.

* * * * *